United States Patent
Rousselin

(12)
(10) Patent No.: US 6,782,918 B2
(45) Date of Patent: Aug. 31, 2004

(54) VALVE DEVICE FOR PRESSURIZED GAS CYLINDER

(75) Inventor: Guy Rousselin, Herry (FR)

(73) Assignee: GCE SAS, La Charite sur Loire Cedes (FR)

( * ) Notice: Subject to any disclaimer, the term of this patent is extended or adjusted under 35 U.S.C. 154(b) by 0 days.

(21) Appl. No.: 10/339,642

(22) Filed: Jan. 10, 2003

(65) Prior Publication Data

US 2003/0150497 A1 Aug. 14, 2003

(30) Foreign Application Priority Data

Jan. 11, 2002 (FR) .............................................. 02 00293

(51) Int. Cl.⁷ .............................................. G05D 16/10
(52) U.S. Cl. .............. 137/613; 137/614.11; 137/614.19
(58) Field of Search ........................... 137/613, 614.11, 137/614.19

(56) References Cited

U.S. PATENT DOCUMENTS

| 4,909,277 | A | | 3/1990 | Vandiver |
| 5,127,436 | A | * | 7/1992 | Campion et al. ...... 137/614.11 |
| 5,937,895 | A | * | 8/1999 | Le Febre et al. ........... 137/613 |
| 6,182,692 | B1 | | 2/2001 | Fischer et al. |

FOREIGN PATENT DOCUMENTS

| DE | 19 00 854 U | 9/1964 |
| EP | 0 863 337 A2 | 9/1998 |
| EP | 0 869 310 A1 | 10/1998 |

* cited by examiner

*Primary Examiner*—Kevin Lee
(74) *Attorney, Agent, or Firm*—Lowe Hauptman Gilman & Berner, LLP

(57) ABSTRACT

A valve device for a pressurised gas cylinder comprising a connector to be connected to a gas outlet orifice of a gas cylinder. A handwheel controls closing a gate valve or opening the gate valve to release gas from the cylinder. The output flow of gas released from the cylinder can be set.

20 Claims, 5 Drawing Sheets

FIG. 5b  A-A

VALVE DEVICE FOR PRESSURIZED GAS CYLINDER

FIELD OF INVENTION

The present invention relates to a valve device for a pressurised gas cylinder. The present invention particularly relates to a valve device with an integrated gas pressure regulator for a compressed oxygen cylinder intended particularly for use in oxygen therapy in medical environments.

BACKGROUND ART

Valves for pressurised gas cylinders are known in prior art. These devices usually comprise a manoeuvre valve for the outlet of high pressure gas, and a manoeuvre valve to adjust the flow of gas, usually pressure reduced, toward the outlet. This has a disadvantage particularly when used for medical emergencies. In this case, the user of an oxygen cylinder with two separate valves, one for the high pressure gas outlet and the other to adjust the output flow of pressure reduced gas toward the patient, must make two successive movements, a first one to open the first valve and then a second one to open the second valve. This takes time and is done at the detriment of the patient. Furthermore, it is possible that the user will panic and use the wrong valve, or possibly not open the valves in the right order.

An object of the present invention is to provide a new and improved valve device for a pressurised gas cylinder, wherein the valve is reliable and easy to (1) manipulate in opening the high pressure valve and (2) adjust the gas flow to overcome the drawbacks of prior art.

SUMMARY OF THE INVENTION

In accordance with one aspect of the invention, a valve device for a pressurised gas cylinder comprises a connector adapted to be connected to a gas outlet orifice of a gas cylinder, a pressurised gas outlet, and a handwheel for controlling closing of the gate valve or opening the gate valve to release gas from the cylinder, and a controller for the output flow of gas released from the cylinder.

According to a preferable feature, the handwheel is rotated in both directions. The handwheel controls during its rotational movement in the opening direction, in a first part of its rotation, the opening of the gate valve to release gas from the cylinder, and in a second part of its rotation, a setting for the flow of gas released toward the valve outlet.

According to another feature, the handwheel is preferably integral with a gate valve stem mounted in a body of the valve by a seal arrangement. Actuation of the control handwheel controls a mobile arrangement for opening and closing the cylinder gate valve through the gate valve stem.

According to another feature, the handwheel is preferably integral with a gate valve stem mounted in the body of the valve by a seal arrangement. The gate valve stem sets the output flow of gas released from the cylinder.

According to another feature, at least two orifices of different sizes extend through the part forming a first end of the gate valve stem, and a third orifice extends in the valve body. The third orifice is connected to the gas outlet. The second part of the rotation of the control handwheel brings one of the two orifices and the third orifice opposite to each other to determine the flow of which gas passes toward the outlet.

According to another feature, in the gate valve open or closed position, the device comprises a holder, which, when the handwheel is actuated, holds the handwheel in a constant projection relative to the valve body.

According to another feature, the holder of the projection of the handwheel relative to the valve body stops the handwheel from moving inwards to or outwards from the valve body.

According to another feature, the first end of the gate valve stem is fixed to the handwheel and the second end of the gate valve stem is integral in rotation with the first end, integral with the handwheel and free in translation relative to the first end. The second end of the gate valve stem is screwed in the valve body. Rotation of the handwheel controls helical movement of the second end of the gate valve stem in the body of the valve. The mobile structure has freedom of translation between an extreme position of closing off the gas supply, and for opening the gas supply. The extreme stopping position or an intermediate position is determined by the position of the second end of the gate valve stem.

According to another feature, the first and second ends of the gate valve stem each comprise a castellation, i.e., toothed wheel, that works with that of the other end so that they abut with each other in rotation.

According to another feature, the first and second ends are connected by a spring that tightens a seal trapped between the first end and the body of the valve.

According to another feature, the mobile structure for opening and closing the gate valve includes a flap with a linear translatory movement inside the body of the valve.

According to another feature, the extreme position of stopping is defined by a part held fixed in place with respect to the body of the valve by a holder.

According to another feature, the flap is mounted on a spring and compresses the spring in response to the second end bearing on the end of the flap.

According to another feature, the device regulates the gas located downstream from the cylinder gas outlet gate valve.

According to another feature, the device comprises a residual pressure system between the regulation device and the cylinder gas outlet valve. Below this residual pressure, a flap no longer allows gas to pass through toward the regulation device.

According to another feature, the device comprises a manometer connected through a duct located upstream from the gas outlet gate valve to measure the pressure in the gas cylinder.

Other features and advantages of the present invention will appear more clearly after reading the description given below with reference to the attached drawings.

BRIEF DESCRIPTION OF THE DRAWING

FIG. 5b is a sectional view along line A—A of FIG. 5a, FIG. 6 is a longitudinal sectional view of a gas supply closing flap.

DETAILED DESCRIPTION OF THE DRAWING

Figure 1:
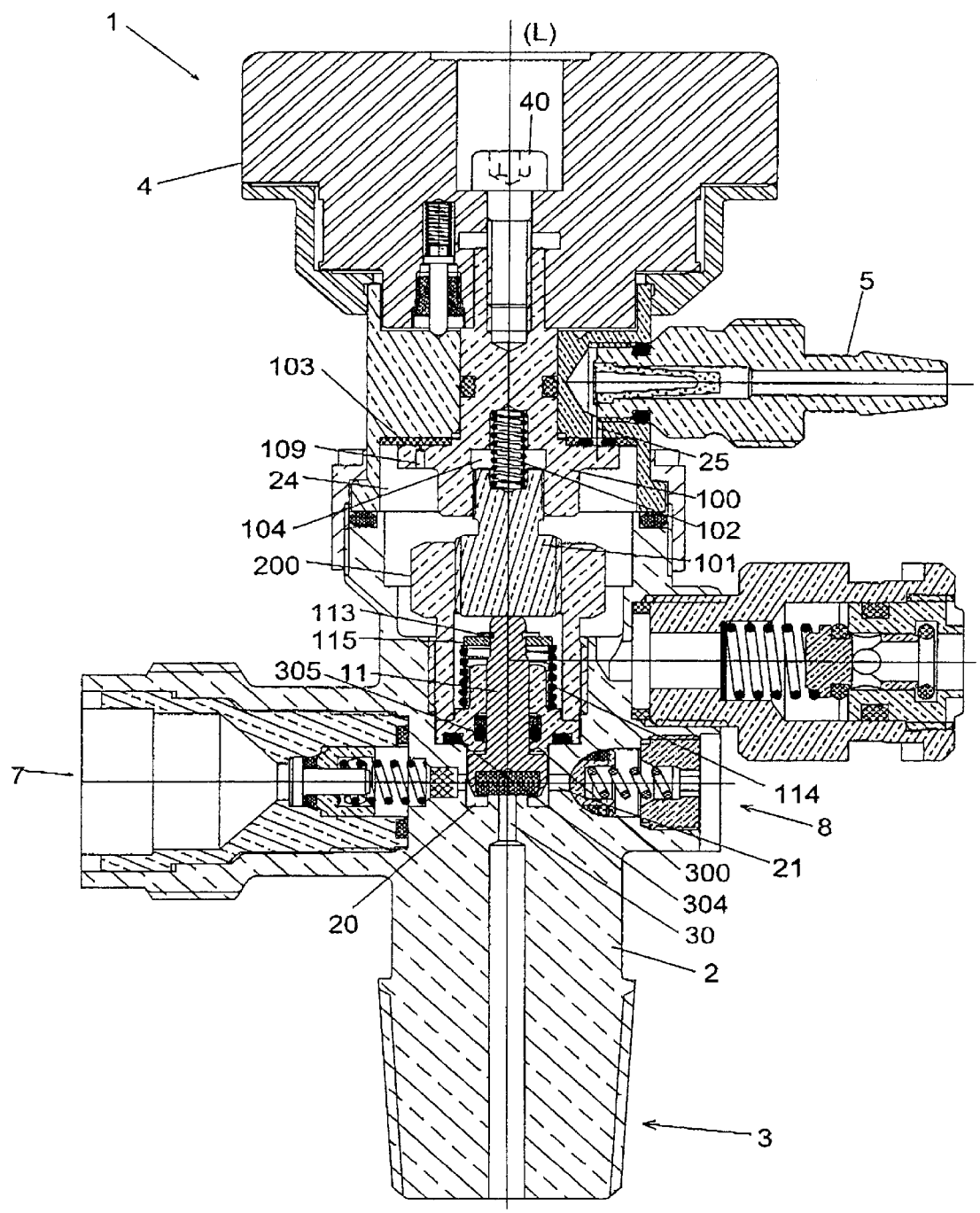
FIG. 1 is a side and partial sectional view of a valve device according to a preferred embodiment of the invention.
Figure 2:
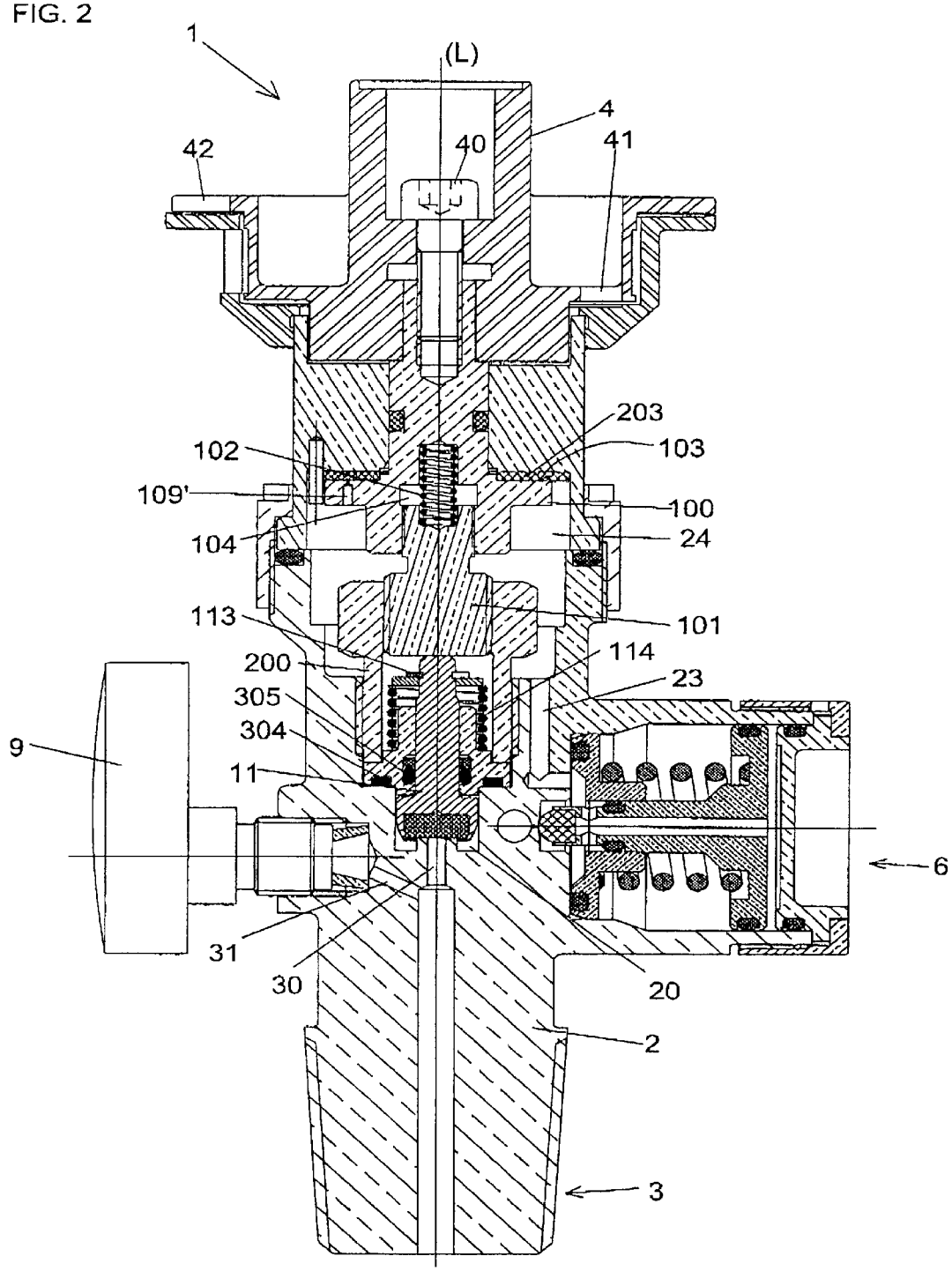
FIG. 2 is a side and partial sectional view of the valve device of FIG. 1, along a plane perpendicular to that of FIG. 1.

The valve device (1, FIG. 1 and FIG. 2) includes a body (2), the lower part (3) of which is conical or approximately cylindrical and is threaded so that it can be fitted in a known manner on an outlet orifice of a gas cylinder. The device (1) comprises on its upper part a control handwheel (4) or button to command the opening and closing of the gas gate valve. This device (1) also comprises a delivered gas pressure reduction device (6) and an outlet (5) for the pressure-reduced gas of the device (1). By way of an example, the pressure reduction device (6) brings the gas, which is for example at a pressure of 200 bars in the cylinder, down to a pressure of about 3.5 bars. A filling orifice (7) is also provided on the body (2) of the device (1) in order to allow the gas cylinder to be filled.

Figure 5A:
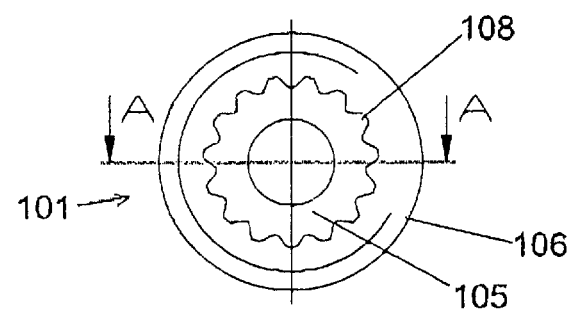
FIG. 5a is a top view of part of the gate valve stem of FIGS. 1–4.
Figure 6:
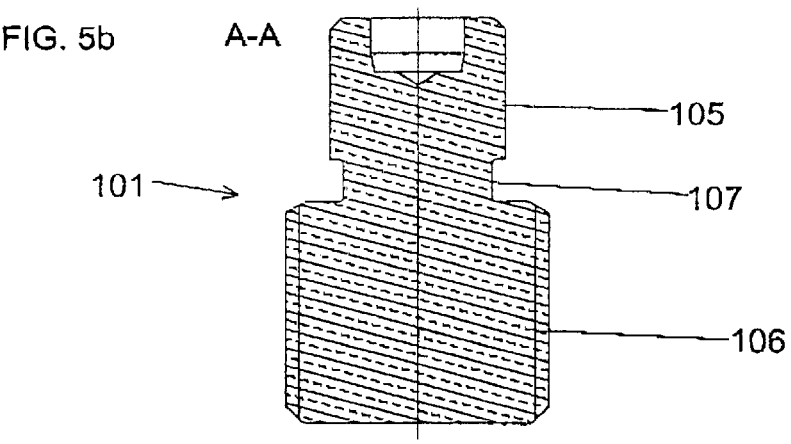
Figure 6:
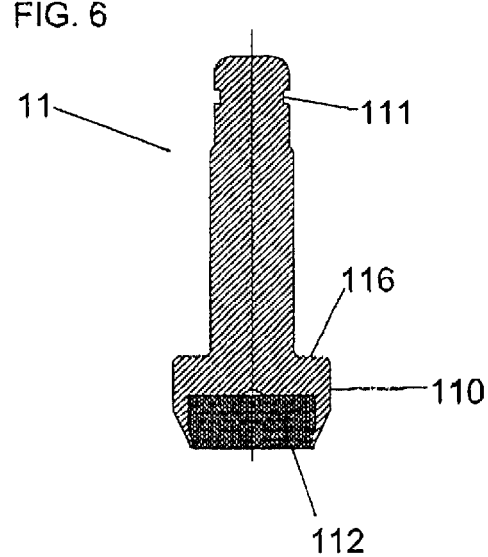

The control handwheel (4) or button, when it is activated, by rotation, controls, via a gate valve stem (10), the translatory movement of a mobile flap (11, FIG. 6) responsible for opening or closing the inlet (30) of gas coming from the cylinder. The gate valve stem (10) is composed of two parts (100, 101) connected by an elastic structure such as a spring (102). A first part (100) of the gate valve stem (10) is integral with the control handwheel (4). This first part (100) of the gate valve stem (10) is integral in rotation with the handwheel (4) by being tightened by one of its ends onto the handwheel, for example by a screw (40), the end of which is housed in this first part (100). This first part of the gate valve stem (10) is, under the action of the handwheel (4), free in rotation around its axis, merged with the longitudinal axis (L) of the device (1). This first part (100) is composed of a cylindrical body comprising a radial shoulder (103) bearing under the action of the spring (102) against a seal (203) that is itself bearing against the body (2) of the device (1). At the end opposite to the end where this first part (100) is fixed to the handwheel (4) there is formed, along the axis (L) of the device (1), a blind hole (104). At the bottom of this blind hole (104) is formed a recess at the bottom of which is fixed one end of the spring (102), its other end being integral with the second part (101) of the gate valve stem (10). This second part (101, FIGS. 5a and 5b) comprises on its so-called upper end a recess at the bottom of which is fixed the end of the spring (102). This second part (101) includes a cylindrical body the ends (105, 106) of which have different diameters. The diameter of the upper end (105) of this second part (101) is smaller than the diameter of its lower end (106). These two ends are separated by a groove (107). A castellation, i.e., toothed wheel, (108, FIG. 5a) is formed along the axis (L) of the device, on the outer surface of the upper end (105) of this second part (101). The castellated upper end (105) is designed to be housed in the blind hole (104) of the first part (100), the blind hole (104) being provided with a complementary castellation on its inner surface. These castellations cooperate to make in rotation the first (100) and the second (101) parts of the gate valve stem (10) integral, i.e., abut, with each other.

Figure 7A:
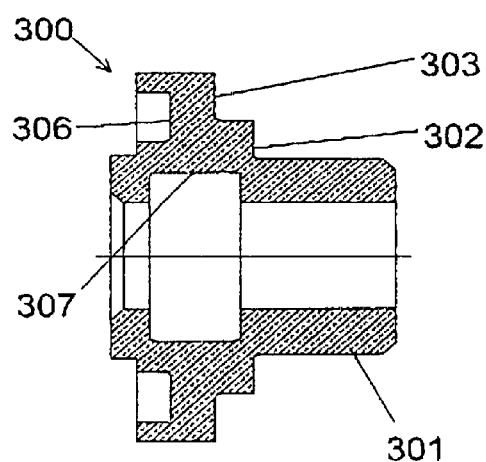
FIGS. 7a and 7b are longitudinal sections along two perpendicular planes, of a gland part used in the valve of FIGS. 1–6, and FIGS. 8a and 8b are a top view and a longitudinal sectional view respectively of a gland nut used in the valve of FIGS. 1–7.
Figure 7B:
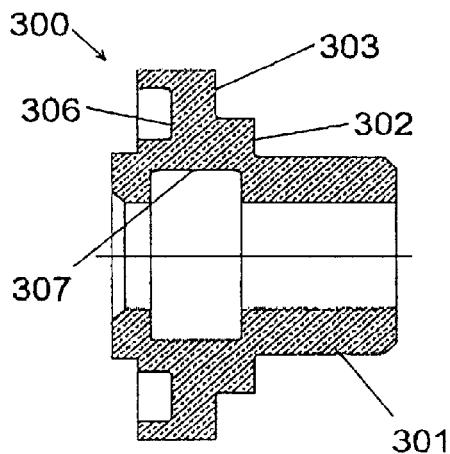
Figure 8A:
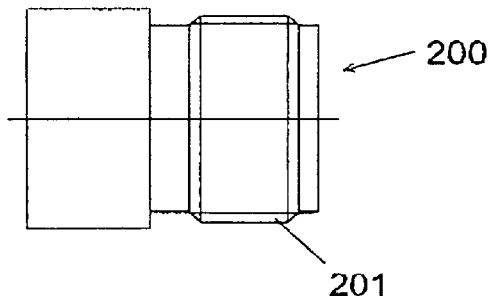
Figure 8B:
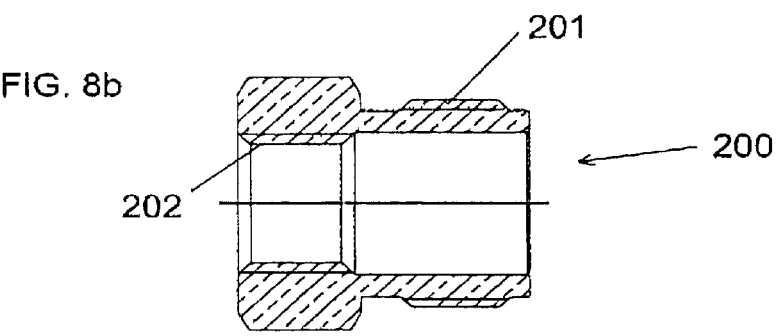

The lower end (106) of the second part (101) is threaded (109) on its external surface and is screwed onto the threaded portion (202) of a gland nut (200, FIGS. 8a and 8b) integral with the body (2) of the device (1). This nut (200) also comprises a threaded portion (201) on its external surface which is screwed into the body (2) of the device (1). The nut screwed into the body (2) of the device tightens a gland part (300, FIGS. 7a and 7b) against the body of the device (1). The nut (200) therefore has the dual function of (1) receiving the threaded lower end (106) of the second part (101) of the gate valve stem (10), and, being screwed onto the body (2) of the device, and (2) tightening the gland part (300). This part (300) is composed of a hollow cylindrical body (301) with a diameter smaller than the internal diameter of the nut (200), and comprises, at a certain distance from its upper end and from this end, two successive shoulders (302, 303), with increasing diameter. The nut (200) has its lower end screwed into the body (2) of the device which is bearing against the second shoulder (303) so as to bear on the surface opposite the shoulder (303) against the body (2) of the device (1). The upper end of this part opens into the nut (200). The lower end of the body (301) of this part (300) is housed in a hole (20) formed in the body (2) of the device (1). At the bottom of this hole (20) is formed a seat onto which the gas inlet duct (30) of the gas cylinder opens. Another duct (21, FIG. 1) opening into this hole (20) and leading to a residual pressure device is formed in the body (2) of the device (1). An annular groove (306, FIGS. 7a and 7b) is formed around the axis of the device (1) on the surface opposite the second shoulder (303). In this groove (306) is placed an O-ring (304, FIG. 1 and FIG. 2) responsible for creating a tight fit between the part (300) and the body (2) of the device (1). Another annular groove (307) is formed around the axis (L) of the device (1) on the internal surface of the part (300). An O-ring (305) is also placed in groove (307) to create the tight fit between the flap (11) and the part (300). The sealing O-rings (304, 305) make it possible to prevent propagation of high-pressure gas in the device (1) and mixing of high-pressure gas with pressure reduced gas. The flap (11, FIG. 6) is composed of a cylindrical rod, the axis of which is merged with the axis (L) of the device (1), comprising at its lower end a portion (110) of larger diameter forming a shoulder (116). The rod is introduced coaxially into the part (300) in order that its shoulder (116) can act as a stop against the lower face of the part (300). The lower face of the flap rod (11) is drilled with a blind hole in which is housed a cylindrical packing (112) of a thermoplastic material or of elastomer, crimped into the flap (11). In the gate valve closed position, this packing bears against the seat formed at the bottom of the hole (20). An annular groove (111) is formed around the axis (L) of the device (1) close to the upper end of the flap rod (11). In this groove (111) is placed a circlip (i.e., c-ring) (113). A spring (114) surrounds the body (301) of the part (300) and its lower end bears against the first shoulder (302) formed on the part (300). A washer (115) of diameter equivalent to the cross-section of the spring is placed between the upper end of the spring (114) and the circlip (113). The maximum clearance in translation of the flap (111) relative to the part (300) is very small, going from the bearing position of the lower face of the packing (112) of the flap (11) on the seat so as to close the gas inlet duct (30) to an open position in which the shoulder (116) of the flap is stopped against the lower face of the part (300).

In the gate valve closed position, the flap packing bears on the seat of the gas inlet duct (30). The flap is then in the low position. In this position, the upper end of the flap (11) is in straightforward contact with the lower face of the second part (101) of the gate valve stem (10) and depending on the screwing of the lower end (106) of the second part (101), the spring (114) surrounding the part (300) is more or less compressed.

When the control handwheel (4) is in the gate valve opening direction, the rotation of the gate valve stem (10) integral with the handwheel (4) causes the lower end (106) of the second part (101) of the gate valve stem (10) to unscrew and, therefore to rise up in the nut (200). Since the upper end of the flap (11) is, in the gate valve closed position, straightforwardly in contact with the lower face of the second part (101) of the gate valve stem (10), the action of the pressure of the gas present in the cylinder or the action of the spring (114) allows the flap which slides along the axis (L) of the device to rise up in the part (300). This sliding occurs until the shoulder (116) formed on the flap (11) is stopped against the lower face of the part (300) and/or until the upper end of the flap (11) is stopped against the lower end (106) of the second part (101) of the gate valve stem (10). The gas inlet duct (30) is no longer closed and the gas is able to leave the cylinder.

To close the gate valve, the user turns the handwheel in the other direction to screw the lower end (106) of the second part (101) of the gate valve stem so as to make it go down, and thus to bear on the upper end of the flap so as to push the flap (11). The flap packing (112) then closes the inlet duct (30) of the cylinder. Screwing may continue for example until the washer (115) bears against the upper face of the part (300). When the gate valve is being closed, the more the user bears against the flap, the more the spring (114) is compressed and the more the seat of the gas inlet duct (30) sinks into the flap packing (112). When the user wishes to open the gate valve, while the seat sinks substantially into the packing (112) of the flap (11), separating the packing (112) under the pressure of the high-pressure gas alone may prove difficult. The spring (114) therefore facilitates this separation by relaxing when translatory movement of the flap (11) is allowed. In other words, when the lower end of the first part (101) of the gate valve stem (10) is brought back up by a certain distance by being unscrewed from the nut (200).

The handwheel, when rotated to open or close, has a constant projection relative to the body (2) of the device (1). This is made possible by the spring (102) connecting the two parts (100, 101) of the gate valve stem (10). Indeed, when for example the lower end of the second part is being unscrewed in the nut (200), since the translatory movement of the first part (100) outwards from and inwards to the device (1) is locked, the second part (101) can be brought back up by compressing the spring (102). When the lower part of the second part is being screwed into the nut (200), the second part (101) can be taken down by unbending the spring (102) connecting the two parts (100, 101).

Figure 3:
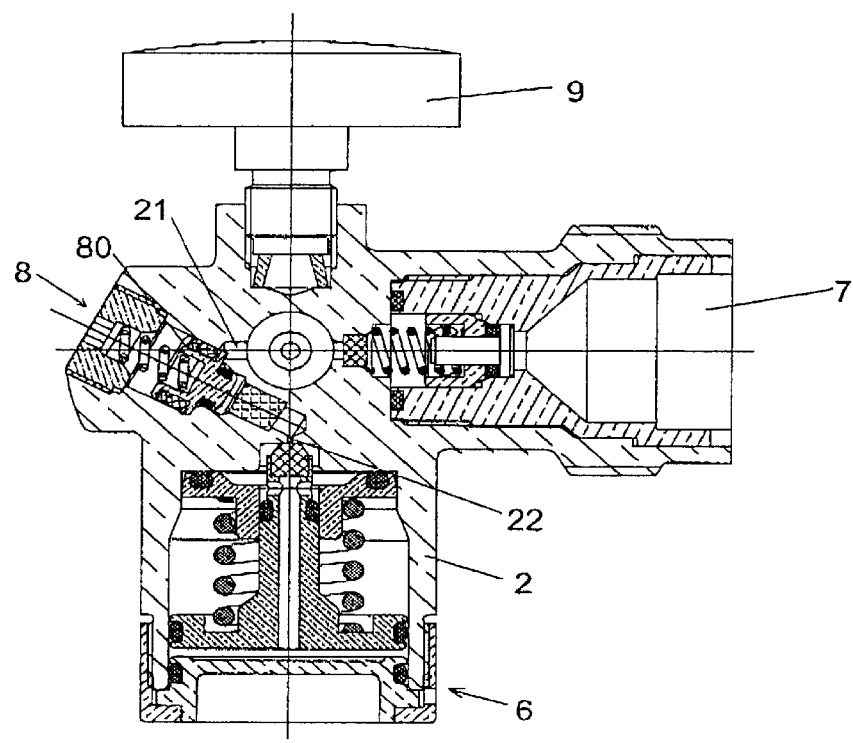
FIG. 3 is a top and partial sectional view of the valve device, along line A—A in FIGS. 1 and 2.

A first part of the rotation of the control handwheel (4) enables the high-pressure gas to be released from the gas cylinder. Once released, this gas passes through the duct (21) formed in the body (2) of the device and opening, for example into a residual pressure device (8). In a known way, such a device makes it possible never to completely empty the cylinder. Indeed, in the case of an oxygen cylinder for medical use, it is necessary to prevent contamination of the interior of the cylinder. To this end, the gas cylinder is maintained at pressure by always keeping a certain quantity of gas in it. For the user, the cylinder appears to be empty whereas in reality it is not. In fact, there is always a certain quantity of pressurised gas in the cylinder. To this end, the device (8) integrated into the device (1) includes a flap (80, FIG. 3) mounted on a spring (114). When the gas arrives from the duct (21), the gas pressure pushes the flap (11) in order to get by. When there is only a very small amount of gas left in the cylinder, the gas pressure is no longer sufficient to push the flap (80) of the device (8). The gas no longer gets through and therefore remains in the cylinder. The spring, for example, has a rigidity constant defining the pressure, for example 3 or 4 bars, below which the flap (80) no longer moves in translation. This device (8) prevents the cylinder from being contaminated and it can then be filled through the filling orifice (7) without being cleaned.

Once the high-pressure gas has passed through the residual pressure device, a duct (22, FIG. 3) formed in the body (2) of the device (1) opens into the gas pressure reduction device (6). The gas pressure is then reduced.

Once the pressure is reduced, for example to 3 or 4 bars, the pressure-reduced gas joins via a duct (23, FIG. 2) a housing (24) formed in the body (2) of the device (1). From there, a second part of the rotation of the control handwheel (4) allows the gas to be released through the device outlet (5).

This second part of the rotation enables the outflow of the pressure-reduced gas to be adjusted. This flow is, for example, displayed on a specific window (41, FIG. 2 and FIG. 4) of the control handwheel (4).

Several orifices (109, 109') with different sizes are for example drilled along a circular arc, parallel to the axis (L) of the device (1), through the first part (100) of the gate valve stem (10) for example at the level of the radial shoulder (103) of this part. These orifices have different sizes, in other words they are of equal diameter but they each comprise a different open upper section. A duct (25, FIG. 1) is formed along the axis (L) of the device (1) in the body (2) of the device. Duct (25) opens onto the gas outlet (5). This duct (25) has a diameter at least equal to the largest of the higher cross-sections of the orifices (109, 109'). Opposite this duct (25), the sealing ring (FIG. 1), placed between the first part (100) of the gate valve stem (10) and the body (2) of the device, is also drilled with a corresponding orifice. As already described above, the first part of the rotation of the handwheel (4) makes it possible to open the gate valve and to release the high-pressure gas whose pressure is then reduced. The second part of the rotation brings opposite to each other one of the orifices (109, 109') formed through the first part (100) of the gate valve stem and the duct (25) formed in the body of the device (1). The pressure-reduced gas present in the housing (24) formed in the body of the device (1) can then pass in the orifice (109, 109') located opposite thence into the outlet duct (5). The handwheel includes, for example, stop cleats each placed to correspond with the position opposite an orifice (109, 109') relative to the duct (25), to each cleat also corresponding the inscription in the window (41, FIG. 4) which can be seen on the handwheel (41), of the flow adjusted by the orifice (109, 109') placed opposite the duct (25).

The gas inlet duct (30) in the cylinder includes a parallel duct (31) leading to a manometer (9) for measuring the pressure of the gas contained in the cylinder.

Figure 4:
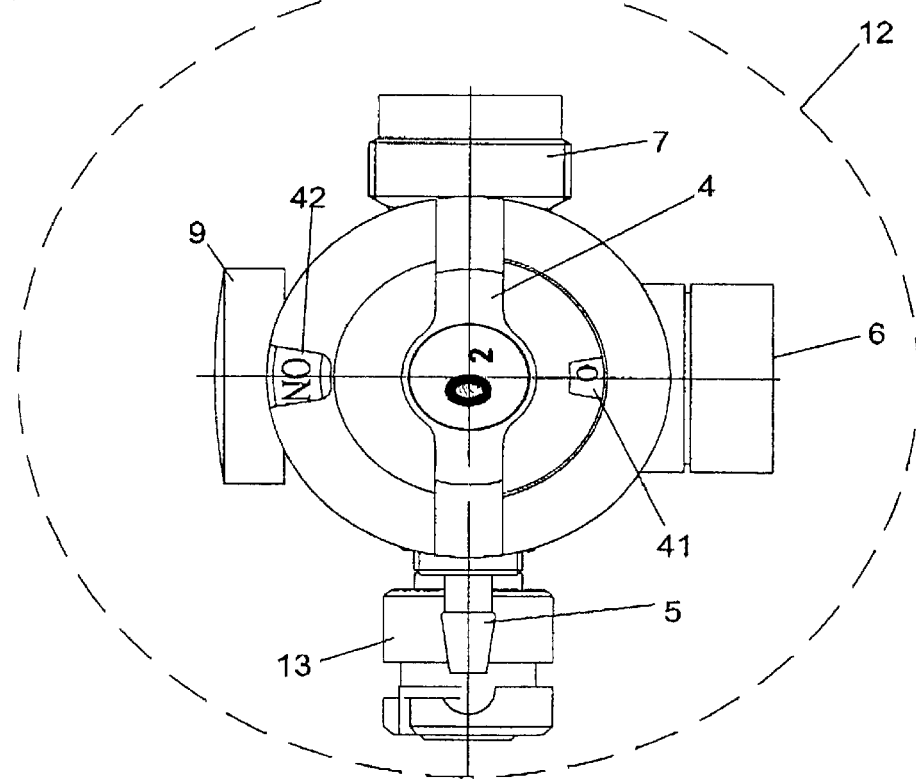
FIG. 4 is a front view of a control handwheel for the valve of FIGS. 1–3.

In the top view of FIG. 4, valve device (1) is connected to an oxygen cylinder (12) drawn in dotted lines. In this figure can be seen the manometer (9) used for measuring the pressure, the cylinder filling connector (7), the gas outlet connector (5), the pressure reduction device (6) and a quick connector (13) for connecting various accessories, placed just below the gas outlet connector (5). It is also possible to see a window (42, FIG. 2) in which it is shown whether or not the gate valve is open, and the window (41) displaying the flow.

It must be obvious for people skilled in the art that the present invention allows embodiments in a number of other specific forms without departing from the field of application of the invention as claimed. Consequently, the present embodiments must be considered as examples, but may be modified in the field defined by the scope of the appended claims, and the invention must not be limited to the details given above.

What is claimed is:

1. Valve device for a pressurised gas cylinder comprising a connector adapted to be connected to a gas outlet orifice of a gas cylinder, a pressurised gas outlet, a handwheel for controlling closing of a gate valve or opening of the gate valve to release gas from the cylinder, and a manual controller for setting an output flow of gas released from the cylinder.

2. Device according to claim 1, wherein the handwheel is rotatable in both directions, the handwheel being arranged for controlling during its rotational movement in the opening direction, in a first part of its rotation opening of the gate valve to release gas from the cylinder, and in a second part of its rotation, setting of the flow of gas released toward the valve outlet.

3. Device according to claim 1, wherein the handwheel is integral with a gate valve stem mounted in a body of the valve device by a seal arrangement, actuation of the handwheel being arranged for controlling a mobile structure for opening and closing a cylinder gate valve to release gas from the cylinder through the gate valve stem.

4. Device according to claim 1, wherein the handwheel is integral with the gate valve stem mounted in a body of the valve device by a seal arrangement, the gate valve stem being arranged for controlling the output flow of gas released from the cylinder.

5. Device according to claim 3, wherein at least two orifices of different sizes extend through the part forming a first end of the gate valve stem, a third orifice extending in the valve body, the third orifice being connected to the gas outlet, the second part of the rotation of the control handwheel causing one of the two orifices and the third orifice to be opposite each other to determine the flow at which gas passes toward the outlet.

6. Device according to claim 1, wherein while the gate valve is in the open or closed position, the device comprises a holder, which, when the handwheel is actuated, is arranged for holding the handwheel in a constant projection relative to the body of the valve device.

7. Device according to claim 6, wherein the holder for holding the projection of the handwheel relative to the valve body comprises a stop for stopping the handwheel from moving inwards toward or outwards from the body of the valve device.

8. Device according to claim 3, wherein the first end of the gate valve stem is fixed to the handwheel, and the second end of the gate valve stem is integral in rotation with the first end integral with the handwheel and free in translation relative to the first end, the second end of the gate valve stem being screwed in the valve body, rotation of the handwheel being arranged for controlling helical movement of the second end of the gate valve stem in the body of the valve, the mobile structure having freedom of translation between an extreme position of closing off the gas supply, and for opening the gas supply, an extreme position of stopping or an intermediate position being determined by the position of the second end of the gate valve stem.

9. Device according to claim 8, wherein the first and the second ends of the gate valve stem each comprise a castellation that works with that of the other end so that they are integral with each other in rotation.

10. Device according to claim 8, wherein the first and the second ends are connected by a spring for tightening a seal trapped between the first end and the body of the valve.

11. Device according to claim 8, wherein the mobile structure for opening and closing the gate valve includes a flap arranged for linear translatory movement inside the body of the valve.

12. Device according to claim 8, wherein the extreme position of stopping is defined by a part held fixed in place with respect to the body of the valve by a holder arrangement.

13. Device according to claim 11, wherein the flap is mounted on a spring, the flap being arranged for compressing the spring in response to the second end bearing on the end of the flap.

14. Device according to claim 1, wherein the device is arranged for regulating the gas located downstream from the gate valve.

15. Device according to claim 14, wherein the device comprises a residual pressure system between the regulation device and a cylinder gas outlet valve, a flap arranged so that below the residual pressure of the residual pressure system, the flap prevents gas from passing toward the regulation device.

16. Device according to claim 1, further comprising a manometer connected through a duct located upstream from the gas outlet gate valve to measure the pressure in the gas cylinder.

17. Valve device for a pressurized gas cylinder comprising:
   a connector adapted to be connected to a gas outlet orifice of a gas cylinder;
   a pressurised gas outlet;
   a controller for an output flow of gas released from the cylinder;
   a shaft for controlling closing of a gate valve or opening of the gate valve to release gas from the cylinder, the shaft being integral with a gate valve stem mounted in a body of the valve device by a seal arrangement, actuation of the shaft being arranged for controlling a mobile structure for opening and closing a cylinder gate valve through the gate valve stem, at least two orifices of different sizes extending through the part forming a first end of the gate valve stem, a third orifice extending in the valve body, the third orifice being connected to the gas outlet, the second part of the rotation of the shaft causing one of the two orifices and the third orifice to be opposite each other to determine the flow at which gas passes toward the outlet.

18. Valve device for a pressurised gas cylinder comprising:
   a connector adapted to be connected to a gas outlet orifice of a gas cylinder;
   a pressurised gas outlet;
   a shaft for controlling closing of a gate valve or opening of the gate valve to release gas from the cylinder; and
   a controller for setting an output flow of gas released from the cylinder, the shaft being integral with a gate valve stem mounted in a body of the valve device by a seal arrangement, actuation of the shaft being arranged for controlling a mobile structure for opening and closing a cylinder gate valve to release gas from the cylinder through the gate valve stem, the first end of the gate valve stem being fixed to the shaft, and the second end of the gate valve stem being integral in rotation with the first end integral with the shaft and free in translation relative to the first end, the second end of the gate valve stem being screwed in the valve body, rotation of the shaft being arranged for controlling helical movement of the second end of the gate valve stem in the body of the valve, the mobile structure having freedom of translation between an extreme position of closing off the gas supply, and for opening the gas supply, an extreme position of stopping or an intermediate position being determined by the position of the second end of the gate valve stem.

19. Device according to claim 18, wherein the first and the second ends of the gate valve stem each comprise a castellation that works with that of the other end so that they are integral with each other in rotation.

20. Device according to claim 18, wherein the first and the second ends are connected by a spring for tightening a seal trapped between the first end and the body of the valve.

* * * * *